Dec. 17, 1963 D. A. WILLIAMS 3,114,797

TELEVISION SYSTEM FOR DETECTION OF DIFFERENCES

Filed Dec. 4, 1961 2 Sheets-Sheet 1

INVENTOR.
David A. Williams
BY
Hill, Sherman, Meroni, Gross & Simpson
ATTORNEYS

Dec. 17, 1963 D. A. WILLIAMS 3,114,797

TELEVISION SYSTEM FOR DETECTION OF DIFFERENCES

Filed Dec. 4, 1961 2 Sheets-Sheet 2

INVENTOR.
David A. Williams
BY
Hill, Sherman, Meroni, Gross & Simpson
ATTORNEYS

United States Patent Office 3,114,797

Patented Dec. 17, 1963

3,114,797

TELEVISION SYSTEM FOR DETECTION OF DIFFERENCES

David A. Williams, Michigan City, Ind., assignor, by mesne assignments, to Harvey-Wells Corporation, Framingham, Mass., a corporation of New Jersey Filed Dec. 4, 1961, Ser. No. 156,681
12 Claims. (Cl. 178—6.8)

Figure 1:
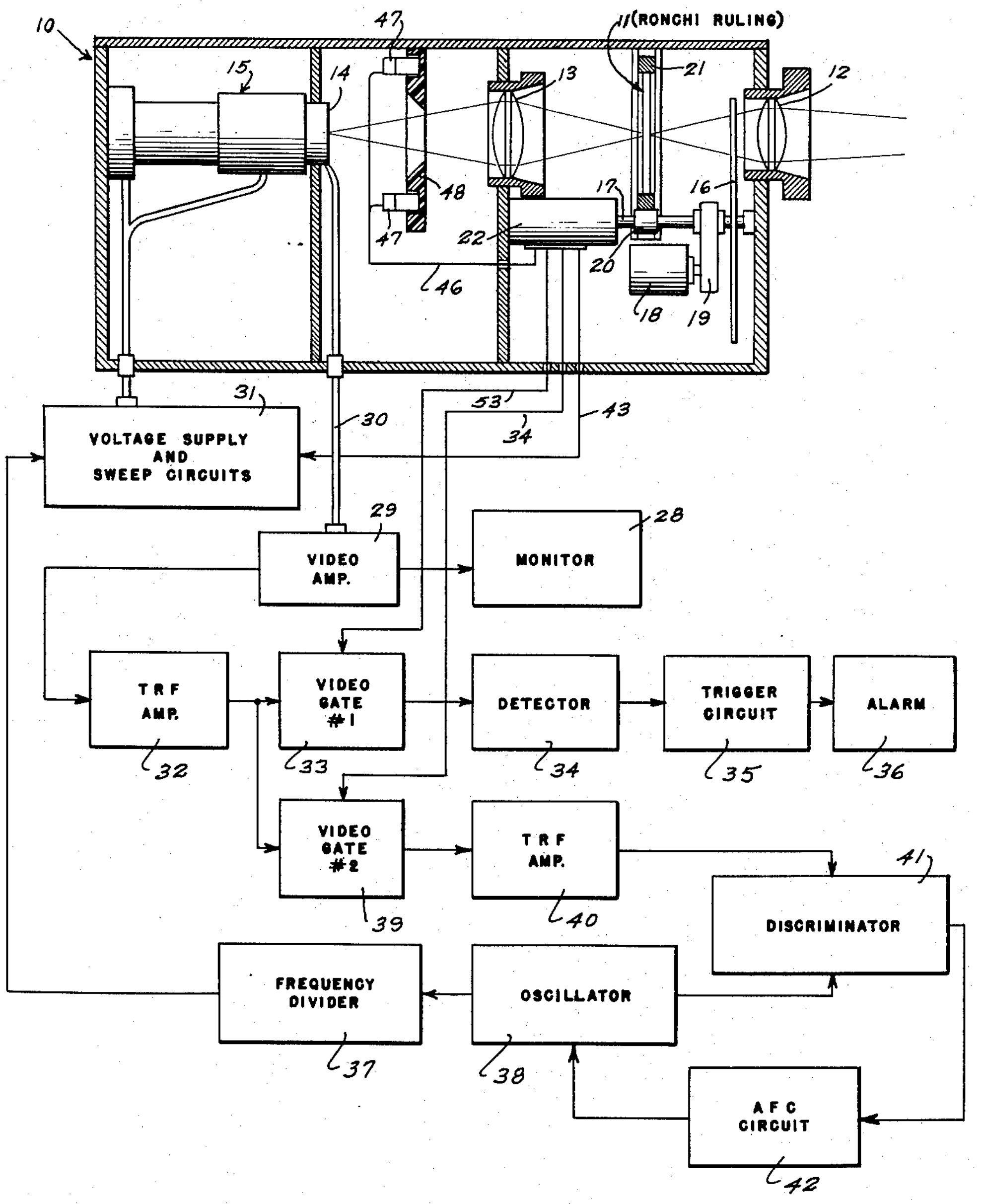

This invention was evolved with the general object of providing a system using television techniques in automatic inspection to detect differences or changes such as, for example, differences or changes in size, shape, color, intensity, texture, etc., or changes in position or orientation, i.e. motion.

According to this invention a television system is used to compare two images and to develop an indication of differences between the images. This system may be used for many purposes, the detection of motion being one example. To detect a motion, an image produced from a scene at one instant is compared with an image produced from the same scene after a certain time delay, and the difference between the two images indicates motion of an object within the scene being viewed. A signal may be produced to energize an alarm, for example, to alert an operator to the motion produced in the scene.

A highly important feature of the invention relates to the production and combination of two images to form a composite image wherein differences in the two images may be readily detected. According to this feature, two images are produced each of which is in the form of spaced parallel bars or lines having widths equal to the spacing therebetween. The images are combined with the lines of one image lying between the lines of the other, to form a composite image. If the two images are identical the lines of one blend into the lines of the other in the composite image. At areas where the two images differ, however, a distinctive result is produced which may be readily detected either visually or electronically.

In particular, a bar pattern is produced in areas where the two images differ, which may be readily detected visually. In addition, when the composite of the two images is scanned in a television camera tube, the areas of difference between the two signals produces a prominence of one particular frequency in the video output. The particular frequency is dependent on the spacing of the lines of the ruling, and the scanning rate.

To produce an image having a bar or line pattern, a device referred to herein as a Ronchi ruling may be placed at the focal plane of a lens system. The Ronchi ruling, as the term is used herein, is a piece of glass or the equivalent with spaced parallel lines thereon having a width substantially equal to the spacing therebetween.

According to a more specific feature of the invention, a Ronchi ruling may be used in the production of two images from a single scene, to detect motion. In accordance with this feature, the Ronchi ruling may be placed at the focal plane of a lens system used to focus an image on the screen of a television camera tube, and a chopped image is produced on the screen of the tube having strips blacked out by the lines of the Ronchi ruling device. This chopped image is exposed on the camera tube and the ruling is then moved through a distance equal to one line width (or an odd number of line widths) and then another exposure is made. The net result is a complete image of the scene with the edges of the strips blending together, except in areas where any object within the scene moves or where an object appears in one image which was not in the other. In such areas, a striped or bar pattern is produced which may be detected visually on a monitor or electronically, by separating out the components of the video signal having a certain frequency.

Additional features of the invention reside in a particular arrangement and circuit used for the detection of motion, and in an arrangement for improving the linearity of the scanning system, to permit more sensitive and reliable detection.

Figure 2:
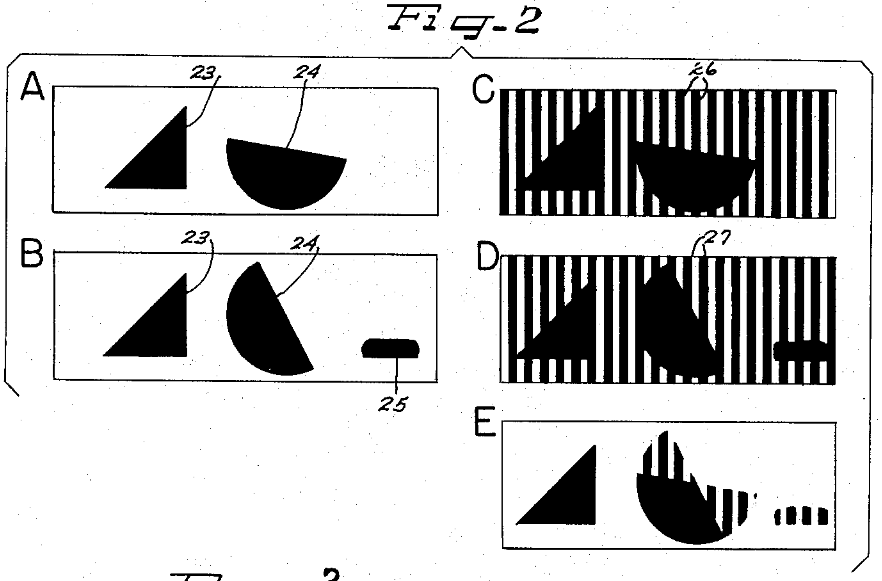
Figure 3:
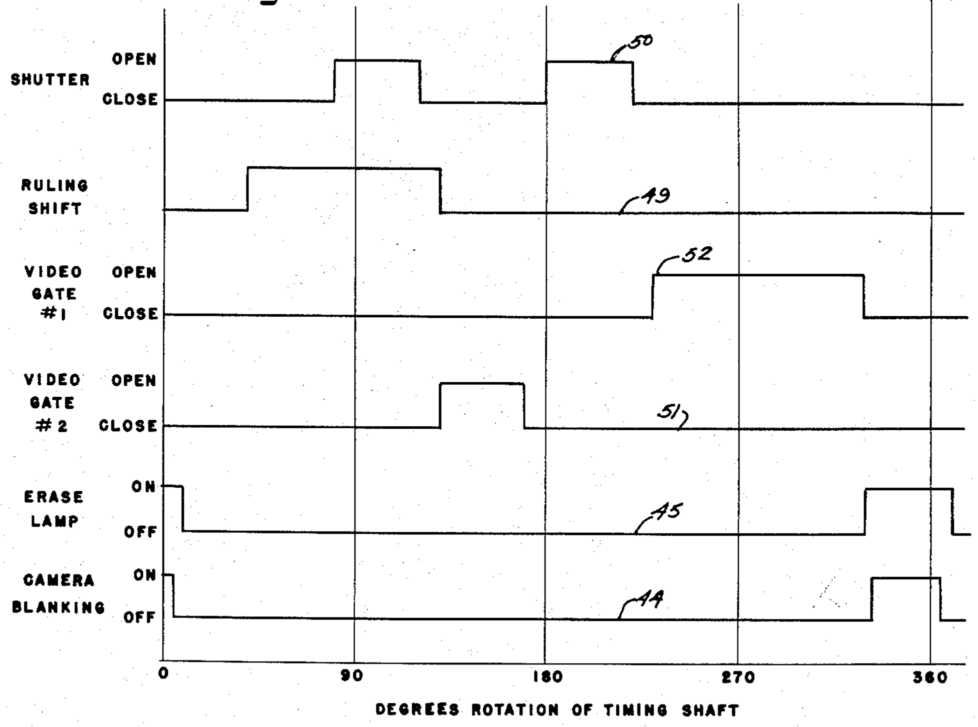

This invention contemplates other and more specific objects, features and advantages which will become more fully apparent from the following description taken in conjunction with the accompanying drawings which illustrate a preferred embodiment and in which:

FIGURE 1 is a diagrammatic view, showing in section a system usable in the detection of motion and electronic circuitry associated therewith;

FIGURE 2 is a view illustrating for purposes of discussion the production and combination of bar pattern images to indicate motion, wherein FIGURE 2A shows the appearance of a scene at one instant, FIGURE 2B illustrates the appearance of the same scene at a later time, FIGURES 2C and 2D illustrate bar pattern images produced from FIGURES 2A and 2B, and FIGURE 2E shows a composite image produced from a combination of the images of FIGURES 2C and 2D; and FIGURE 3 is a graph illustrating the sequence of operation of elements of the system of FIGURE 1.

As shown on the drawings:

Referring to FIGURE 1, reference numeral 10 generally designates a system constructed according to the principles of this invention, particularly designed for detecting motion.

The motion detection system 10 comprises a Ronchi ruling device 11 which is disposed at a focal plane of a lens system which, as diagrammatically illustrated, includes a camera lens 12 and a relay lens 13 used to project an image on the screen 14 of a television camera tube 15.

The Ronchi ruling device 11 is a piece of glass with opaque spaced parallel lines thereon having widths substantially equal to the spacing therebetween. With the device 11, a chopped image is produced on the screen 14 of the camera tube 15. The ruling 11 is then moved through a distance equal to one line width (or an odd number of line widths) and then another exposure is made. The net result is a complete image of the scene with the edges of the strips blending together. In the illustrated system, the exposures are controlled by a rotating shutter 16.

The shutter plate 16, in the arrangement as diagrammatically illustrated, is mounted on a shaft 17 which is driven at a relatively slow speed, for example 1 revolution per second, by means of a motor 18 coupled thereto through a gear reduction unit 19. The shaft 17 also carries a cam 20 which actuates a frame 21 of the Ronchi ruling device 11, to move the device through a distance equal to one line width at appropriate times during each revolution of the shaft 17. Shaft 17 additionally operates a switch unit 22 to perform various operations as described hereinafter.

FIGURE 2 illustrates the principle of operation of the system 10. FIGURE 2A shows the appearance of a portion of a scene at one interval of time when the shutter is open. As shown, the scene includes a dark triangular object 23 and a dark semi-circular plate 24, on a light background. FIGURE 2B illustrates the appearance of the same portion of the scene, at a later time when the shutter is open. As shown, the triangular object 23 is in the same position, while the semi-circular object 24 is rotated through a certain angle from the position shown in FIGURE 2A. In addition, an object 25 appears in the portion of the scene as depicted in FIGURE 2B, which did not appear in the scene as depicted in FIGURE 2A.

FIGURE 2C illustrates the image projected on a portion of the screen 14 of the television camera tube 15, from the scene portion illustrated in FIGURE 2A. The image portion of FIGURE 2C has spaced parallel dark bars or lines 26, having widths substantially equal to the spacing therebetween, as a result of the opaque lines or bars of the Ronchi ruling 11. FIGURE 2D illustrates an image portion on the face of the screen 14 of the camera tube 15, resulting from the scene portion of FIGURE 2B. This image portion also contains spaced parallel dark bars or lines 27. However, the lines 27 are displaced from the lines 26 to lie therebetween, due to movement of the Ronchi ruling.

FIGURE 2E illustrates a composite image portion produced on the screen 14 of the camera tube 15, from a combination of the image portions of FIGURES 2C and 2D. It will be noted that the composite image portion of FIGURE 2E is identical to the scene portions of FIGURES 2A and 2B, where such scene portions are the same. However, where the scene portions of FIGURES 2A and 2B are different, a series of lines or bars are produced in the composite image of FIGURE 2E.

Because of the distinctive appearance thereof, the areas of the composite image having the lines or bars therein can be readily detected visually. In addition the bar or line pattern can be detected electronically, by scanning the composite image produced on the camera tube screen 14 along lines transverse to the bars or lines of the image pattern, to develop a signal component having a frequency dependent upon the spacing of the lines of the pattern and the scanning rate.

It is possible to develop the visual indication directly, but the indication is preferably developed through a television system on a monitor 28 which is connected to the output of a video amplifier 29 having an input connected through a line 30 to the target or signal electrode of the camera tube 15, which is preferably a Permachon or similar type of tube which simultaneously stores and reads out an image only while being scanned. The camera tube 15 is of course connected to suitable supply and sweep circuits 31 as diagrammatically illustrated.

To electronically detect the bar or line pattern, the output of the video amplifier 29 is applied to a tuned radio frequency amplifier 32, the output of which is applied through a gate circuit 33, labelled "Video Gate No. 1," to a detector circuit 34. The TRF amplifier 32 is tuned to a particular frequency, dependent upon the spacing of the lines of the Ronchi ruling and the scanning rate, to respond to components of the video signal of that frequency, and to develop an output in the detector 34 when the gate circuit 33 is open. The output of the detector 34 may be applied to any desired indicating or recording device. As illustrated, it is applied to a trigger circuit 35, preferably a Schmidth trigger circuit, operative to develop an output signal when the output of the detector 34 exceeds a certain threshold value. The output of the trigger circuit 35 is applied to an alarm 36, to develop an audio or visible indication, or both.

To obtain optimum operation of the electronic detection system, it is important that the image be scanned along lines approximately perpendicular to the lines or bars produced by the Ronchi ruling, at a rate which is very uniform. According to a further feature of the invention, means are provided for accurate control of the sweep rate. For purposes of discussion, it may be assumed that the diagrammatic view of the physical portion of the system as shown in FIGURE 1 is a horizontal section, looking downwardly, that the lines of the Ronchi ruling extend vertically, and that sawtooth sweep signals are applied to the camera tube 15 to scan the screen horizontally and vertically, with the horizontal or line rate being much higher than the vertical or frame rate. Under such conditions, it is desirable that the horizontal sawtooth signal should have the highest possible linearity and amplitude stability, i.e. it should have constant amplitude. It should be understood, of course, that the system may be operated in any desired position and reference to the "horizontal" sweep rate should not be construed as a limitation to position.

To obtain the highest possible linearity of the horizontal sweep or scan, the horizontal sweep generator, of the conventional supply and sweep circuits 31, is controlled from the output of a frequency divider 37 which is supplied with a signal from a variable frequency oscillator 38, and the frequency of the oscillator 38 is automatically controlled, in accordance with signals obtained from scanning of the camera tube screen.

In particular, the output of the TRF amplifier 32 is applied through a second gate circuit 39, labelled "Video Gate No. 2" to another tuned radio frequency amplifier 40. Gate circuit 39 is opened after a first exposure of the camera tube and is closed before the second exposure, to obtain only a signal from the first chopped picture which has a very predominant RF signal at a particular frequency as determined by the spacing of the lines of the ruling and the scanning rate. With reference to FIGURE 2, it will be apparent that scanning of an image obtained from a first exposure, such as shown in FIGURE 2C, would have a very predominant RF signal component.

The output of the TRF amplifier 40 and a signal from the oscillator 38 are applied to a discriminator 41, the output of which is applied to the oscillator 38 through an automatic frequency control circuit 42. In operation, the circuit operates to keep the oscillator 38 locked to the center frequency of the TRF amplifier 40, through the AFC circuit. The AFC circuit should preferably have a very long time constant to take several exposures to react and to give the oscillator a large flywheel effect. The horizontal sweep amplifier in the circuits 31, controlled by the output of the frequency divider 37, should preferably be provided with a large amount of negative feedback to obtain high linearity.

FIGURE 3 graphically illustrates the sequence of operation of the various elements and circuits, in response to rotation of the timing shaft 17. At a certain position of the shaft 17, which may arbitrarily be taken as its 0° position, a blanking signal is applied from the switch unit 22 to the voltage supply and sweep circuits 31, through a line 43, the energization of the camera blanking circuit being indicated by line 44 in FIGURE 3. At the same time, as indicated by line 45 in FIGURE 3, an energizing signal is applied from the switch unit 22 over a line 46 to erase lamps 47, which illuminate an acrylic sheet 48 to illuminate the screen 14 and effectively erase any image therefrom.

As the shaft 17 is rotated, the camera is unblanked and the erase lamps are deenergized. Then the Ronchi ruling 11 is shifted from a first position to a second position by the cam 20, as indicated by line 49 in FIGURE 3. Next, the shutter disc 16 is opened and then closed after a certain time interval, as indicated by line 50 in FIGURE 3. Next, the video gate circuit No. 2 is opened, as indicated by line 51 in FIGURE 3, to apply a signal to the TRF amplifier 40 for stabilization of the horizontal sweep generator in the manner as described above. At the same time, the Ronchi ruling 11 is shifted from its second position back to its first position. After the video gate No. 2 is again closed, the shutter 16 is opened to develop a second exposure while the Ronchi ruling is in its first position. Next, the video gate No. 1 is opened, as indicated by line 52 in FIGURE 3, to apply to the detector 34 a signal corresponding to the composite image formed by a combination of the images developed from the two exposures. The control signals are applied from the switch unit 22 to the video gates 33 and 39 through lines 53 and 54. After closing video gate No. 1, the erase lamps 47 are again energized, after which the camera is again blanked.

As above noted the frequency of tuning of the TRF amplifiers 32 and 40 is dependent upon the spacing of the lines of the Ronchi ruling and the scanning rate. In particular, the frequency of tuning should be approximately equal the number of lines traversed during one horizontal scan divided by the duration of one horizontal scan. For example, with a Ronchi ruling having 480 lines per inch, focused on a camera tube screen without reduction, the width of the scanned area of the screen being 0.67 inch and the horizontal sweep rate being approximately 15,000 per second, the TRF amplifiers should be tuned to about 4.8 mc. It will be understood of course that considerably different spacings, sweep rates, etc. may be used as required in a particular application.

This invention thus provides a comparatively simple but very sensitive and reliable system for detecting differences between two scenes wherein the areas of difference are readily detected either visually or electronically. The illustrated system is used in the detection of motion, but it will be apparent that the principles of the invention can be applied as well in the detection of other differences such as differences in size, shape, color, intensity, texture, etc.

It will be appreciated that various modifications may be made. For example, the Permachon type of tube may be replaced with a Vidicon by making appropriate changes, as by inventing the blanked and unblanked periods and eliminating the erase lamps.

It will be understood that other modifications and variations may be effected without departing from the spirit and scope of the novel concepts of the invention.

I claim as my invention:

1. In a system for detecting differences between two scenes, means for developing a first image including a first series of spaced parallel dark lines and lines therebetween corresponding to one of said scenes, means for superimposing on said first image a second image including a second series of spaced parallel dark lines and lines therebetween corresponding to the other of said scenes, said second series of dark lines being disposed between said first series of dark lines, whereby a bar pattern is produced in the composite of said images at areas of difference between said two scenes.

2. In a system for detecting differences between two scenes, a television camera tube having a screen, means for impinging on said screen a first image including a first series of spaced parallel dark lines and lines therebetween corresponding to one of said scenes, means for superimposing on said first image a second image including a second series of spaced parallel dark lines and lines therebetween corresponding to the other of said scenes, said second series of dark lines being disposed between said first series of dark lines, whereby a bar pattern is produced in the composite of said images at areas of difference between said two scenes, means for scanning said screen to produce a video signal, and a monitor responsive to said video signal.

3. In a system for detecting differences between two scenes, a television camera tube having a screen, means for impinging on said screen a first image including a first series of spaced parallel dark lines and lines therebetween corresponding to one of said scenes, means for superimposing on said first image a second image including a second series of spaced parallel dark lines and lines therebetween corresponding to the other of said scenes, said second series of dark lines being disposed between said first series of dark lines, whereby a bar pattern is produced in the composite of said images at areas of difference between said two scenes, means for scanning said screen along lines transverse to said first and second series of lines to produce a video signal including a component of a particular frequency in response to said bar pattern, and means for detecting signals of said particular frequency.

4. In a system for detecting motion, means for developing a first image including a first series of spaced parallel dark lines and lines therebetween corresponding to a scene at one instant of time, means for superimposing on said first image a second image including a second series of spaced parallel dark lines and lines therebetween corresponding to a scene at a later instant of time, said second series of dark lines being disposed between said first series of dark lines, whereby a bar pattern is produced in the composite of said images at areas of difference between said two scenes caused by motion therein.

5. In a system for detecting differences between two scenes, means including a Ronchi ruling for developing a first image and a second image superimposed on said first image, wherein said first image includes a first series of spaced parallel dark lines and lines therebetween corresponding to one of said scenes and wherein said second image includes a second series of spaced parallel dark lines and lines therebetween corresponding to the other of said scenes with said second series of dark lines being disposed between said first series of dark lines, whereby a bar pattern is produced in the composite of said images at areas of difference between said two scenes.

6. In a system for detecting differences between two scenes, a lens system having a plurality of focal planes, a Ronchi ruling located at one of said focal planes for developing at another of said planes a first image including a first series of spaced parallel dark lines and lines therebetween corresponding to a scene, and means for moving said Ronchi ruling transversely to develop at said another of said planes a second image including a second series of spaced parallel dark lines and lines therebetween corresponding to another scene, said second series of lines being located between said first series of lines, whereby a bar pattern is produced in the composite of said first and second images at areas of difference between said scenes.

7. In a system for detecting differences between two scenes, a television camera tube having a screen, means for scanning said screen to produce a video signal, cyclically operable control means, means including a shutter operated by said control means for impinging on said screen a first image including a first series of spaced parallel dark lines and lines therebetween corresponding to one of said scenes and for thereafter impinging on said screen a second image including a second series of spaced parallel dark lines and lines therebetween corresponding to the other of said scenes, said second series of dark lines being disposed between said first series of dark lines, an output circuit, and gate means controlled by said control means for applying said video signal to said output circuit bearing a final portion of each cycle of operation following impingement of both of said images on said screen.

8. In a television camera system, a television camera tube having a screen, means including horizontal and vertical sweep circuits for scanning said screen at horizontal line and vertical frame rates to produce a video signal, means for impinging on said screen an image including a series of spaced parallel dark vertical lines to produce a component of a certain frequency in said video signal, means including oscillator means for controlling the operation of said horizontal sweep circuit, and automatic frequency control means responsive to said component and a signal from said oscillator means to control the frequency of said oscillator means and to maintain said component at a substantially fixed frequency.

9. In a television camera system, a television camera tube having a screen, means including horizontal and vertical sweep circuits for scanning said screen at horizontal line and vertical frame rates to produce a video signal, cyclically operable control means, means including a shutter operated by said control means for impinging on said screen a first image including a first series of spaced parallel dark vertical lines and lines therebetween corresponding to one of said scenes and for thereafter impinging on said screen a second image including a second series of spaced parallel dark vertical lines and lines therebetween corresponding to the other of said scenes, said second series of dark lines being disposed between said first series of dark lines, an output circuit, first gate means controlled by said control means for applying said video signal to said output circuit during a final portion of each cycle of operation following impingement of both of said images on said screen, an automatic circuit for controlling the rate of operation of said horizontal sweep circuit, and second gate means controlled by said control means to apply said video signal to said automatic control circuit during a portion of each cycle of operation between impingement of said images on said screen.

10. In a television camera system, a television camera tube having a screen, means for scanning said screen at horizontal line and vertical frame rates to produce a video signal, cyclically operable control means, means including a shutter operated by said control means for impinging on said screen a first image including a first series of spaced parallel dark vertical lines and lines therebetween corresponding to one of said scenes and for thereafter impinging on said screen a second image including a second series of spaced parallel dark vertical lines and lines therebetween corresponding to the other of said scenes, said second series of dark lines being disposed between said first series of dark lines, a tuned radio frequency amplifier for amplifying a component of said video signal having a particular frequency, a detector circuit, and a gate circuit controlled by said control means to apply the output of said tuned radio frequency amplifier to said detector circuit during a final portion of each cycle of operation following impingement of both of said images on said screen.

11. In a television camera system, a television camera tube having a screen, means for scanning said screen at horizontal line and vertical frame rates to produce a video signal, cyclically operable control means, means including a shutter operated by said control means for impinging on said screen a first image including a first series of spaced parallel dark vertical lines and lines therebetween corresponding to one of said scenes and for thereafter impinging on said screen a second image including a second series of spaced parallel dark vertical lines and lines therebetween corresponding to the other of said scenes, said second series of dark lines being disposed between said first series of dark lines, a tuned radio frequency amplifier for amplifying a component of said video signal having a particular frequency, a detector circuit, a gate circuit controlled by said control means to apply the output of said tuned radio frequency amplifier to said detector circuit during a final portion of each cycle of operation following impingement of both of said images on said screen, and a trigger circuit responsive to the output of said detector circuit to develop an output signal when the output of said detector circuit exceeds a certain threshold value.

12. In a system for detecting differences between two scenes, a television camera tube having a screen, means for scanning said screen to produce a video signal, cyclically operable control means, means including a shutter operated by said control means for impinging on said screen a first image including a first series of spaced parallel dark lines and lines therebetween corresponding to one of said scenes and for thereafter impinging on said screen a second image including a second series of spaced parallel dark lines and lines therebetween corresponding to the other of said scenes, said second series of dark lines being disposed between said first series of dark lines, an output circuit, gate means controlled by said control means for applying said video signal to said output circuit bearing a final portion of each cycle of operation following impingement of both of said images on said screen, and erase lamp means operated by said control means following operation of said gate means.

References Cited in the file of this patent

UNITED STATES PATENTS

| | | |
|---|---|---|
| 2,016,036 | Fitzgerald | Oct. 1, 1935 |
| 2,679,636 | Hillyer | May 25, 1954 |
| 2,969,477 | Gebel | Jan. 24, 1961 |